Patented Aug. 7, 1951

2,563,555

UNITED STATES PATENT OFFICE 2,563,555

REINFORCED ELASTIC ORGANO-SUBSTITUTED POLYSILOXANES CONTAINING TREATED PIGMENTS

Moyer M. Safford, Schenectady, N. Y., assignor to General Electric Company, a corporation of New York No Drawing. Application July 26, 1947, Serial No. 764,017

15 Claims. (Cl. 260—37)

This invention relates to solid, elastic, organo-substituted polysiloxanes having incorporated therein improved fillers. More particularly, the invention is concerned with a heat-convertible composition of matter comprising (1) a solid, elastic, polymerized, organo-substituted polysiloxane containing an average of from about 1.95 to 2.0 organic groups per silicon atom and (2) a filler treated with a composition comprising an organohalogenosilane, the said filler being a material selected from the class consisting of (a) clays, e. g., alumino-silicic acids, etc., and (b) silica-containing fillers, other than such alumino-silicic acid clays, containing, by weight, from about 50 to 80 per cent $SiO_2$ and from about 50 to 20 per cent for example, from 50 to 19.21%, of a material selected from the class consisting of oxides of aluminum, oxides of magnesium, oxides of alkali metals, oxides of alkali (alkaline) earth metals, and mixtures thereof.

Titanium dioxide has been found to be among the more suitable fillers which can be incorporated in solid, elastic, polymerized, organo-substituted polysiloxanes containing an average of from about 1.95 to 2.0 organic groups per silicon atom (for brevity, the aforementioned polysiloxane will hereinafter be referred to as the "elastic product") to obtain optimum physical properties, such as tensile strength, elongation or elasticity, heat-resistance, etc. The elastic products referred to above and methods for preparing the same are more particularly disclosed and claimed in Wright et al. application Serial No. 526,472 and Agents application Serial No. 526,473, both filed March 14, 1944, now U. S. Patents 2,448,565 and 2,448,756, respectively issued September 7, 1948; Krieble et al. application Serial No. 598,914, filed June 11, 1945, now U. S. Patent 2,457,688, issued December 28, 1948, and Sprung application, Serial No. 722.457, filed January 16, 1947, now U. S. Patent 2,484,595, issued October 11, 1949, all the foregoing applications being assigned to the same assignee as the instant invention.

It has often been desired to use less expensive fillers such as clays and other substantially inorganic fillers containing varying proportions of $SiO_2$. However, such compositions have heretofore not been employed successfully as fillers because of the low tensile strengths and poor elongation properties imparted to the filled elastic product.

The present invention is based on my discovery that substantially inorganic fillers of the types disclosed above can be employed as fillers for the aforementioned heat-convertible, elastic products to give filled compositions of matter which, upon conversion under the influence of heat and pressure, yield products having tensile strengths and elongations comparable to those of elastic products containing titanium dioxide as a filler. In accordance with my invention I am able to make use of the aforementioned class of fillers by first treating the said fillers with an organohalogenosilane (preferably with the vapors of said organohalogenosilane), for example, a methylhalogenosilane or a mixture of such halogenosilanes capable of rendering the treated material water-repellent.

Examples of organohalogenosilanes suitable for the purpose of the present invention and methods of using the same are given in Patnode Patent 2,306,222 and Norton Patents 2,386,259 and 2,412,470, all of which patents are assigned to the same assignee as the present invention. Examples of organo-substituted halogenosilanes which may be employed are alkyl-substituted halogenosilanes, for example, methyl, ethyl, propyl, etc.; aryl, for example, phenyl, naphthyl, etc.; alkaryl, for example, tolyl, xylyl, etc.; and aralkyl, for example, benzyl, etc. I prefer to employ, as a treating agent, compositions comprising a methylhalogenosilane or a mixture of methylhalogenosilanes, particularly compositions comprising an azeotropic mixture of silicon tetrachloride and trimethylchlorosilane such as described in the aforementioned Norton Patent 2,412,470.

I have found that the treatment of the fillers (advantageously in a finely divided state) with organo-substituted halogenosilanes, preferably containing an average of more than 1 and less than 3 organic groups attached to silicon, produces a water-repellent filler which when incorporated in the elastic product, preferably, together with a cure accelerator for converting or vulcanizing the elastic product, results in a product having a tensile strength and elasticity superior to those of products containing the untreated fillers when the filled materials are converted under heat and pressure to cured synthetic, organo substituted polysiloxane elastomers.

It was quite surprising and in no way could have been predicted that the treatment of the aforementioned class of fillers with an organohalogenosilane would result in the improvement in properties noted above. Such results were all the more unexpected in view of the fact that the treatment of, for instance, titanium dioxide with the vapors of organohalogenosilanes resulted in no advantage in the filled elastic product. In addition, attempts to use substantially pure silica (SiO₂) which had been previously treated with the organohalogenosilane resulted in a filled elastic product which when converted, under heat and pressure, to a cured synthetic elastomer had inferior strength and elongation properties to that obtained using the treated fillers employed in my invention.

The treated fillers may be prepared, for example, by agitating a finely divided filler of the class disclosed above in a closed container filled with vapors of the treating material, and permitting the treating material to be hydrolyzed by the adsorbed or hydrated water present in the particles of filler, followed by heating of the treated material, i. e., the clay or silica-containing filler, at about 60° to 120° C. until there is no noticeable odor of hydrogen chloride evolved. The amount of treating organohalogenosilane, although not critical, will depend upon the particular halogenosilane employed. With methylhalogenosilanes or mixtures thereof, e. g., with silicon tetrachloride, I prefer to use from about 1 to 10 per cent, by weight, of treating material based on the weight of the filler to be treated.

The solid, elastic, curable (i. e., heat-convertible), polymerized, organo-substituted polysiloxanes with which this invention is concerned are those containing an average ratio of from about 1.95 to 2.0 organic groups per silicon atom, and where at least 90 per cent of the silicon atoms have two organic groups, e. g., two hydrocarbon groups, attached thereto, the remaining 10 per cent or less of the silicon atoms having from 1 to 3 organic groups attached to the silicon atoms so that the overall proportion of organic groups or radicals to silicon atoms in the entire organo-substituted polysiloxane is still within the average range of from 1.95 to 2.0.

I prefer to employ elastic products containing an average of from about 1.95 to 2.0, more particularly, 1.98 to 2.0, methyl groups per silicon atom wherein from about 95 to 100 per cent of the silicon atoms have attached thereto two methyl groups through C—Si linkages, the remaining silicon atoms, if any, being substituted by from 1 to 3 methyl groups so that the overall ratio of methyl groups to silicon atoms in the entire methyl-substituted polysiloxane is within the average range of from about 1.95 to 2.0, preferably 1.98 to 2.0, methyl groups per silicon atom. As stated previously, many of the elastic products which may be employed in the practice of my invention are more particularly disclosed and claimed in the aforementioned Agens, Wright et al., Sprung, and Krieble et al. applications (supra).

For example, in the more specific embodiments of my invention, I employ solid, elastic, curable, methylpolysiloxanes containing an average of from 1.98 to 2.0 methyl groups per silicon, the said solid methylpolysiloxanes being obtained by condensing a liquid polymeric dimethylsiloxane containing up to 2 mol per cent copolymerized monomethylsiloxane, the preparation of which solid methylpolysiloxanes being more particularly described in the aforementioned Agens and Wright et al. applications.

The fillers with which my invention is concerned comprise clays such as alumino-silicic acids, and silica-containing fillers comprising, by weight, from about 50 to 80 per cent SiO₂ and from about 50 to 19.21 per cent of a material selected from a class consisting of oxides of aluminum, oxides of magnesium, oxides of alkali metals, oxides of alkali earth metals, and mixtures thereof, wherein the total per cent of the ingredients comprising the aforementioned silica-containing material is preferably equal to 100 per cent, although there may be included varying very small per cents of other materials and minerals, for example, water (often present in the form of water of crystallization), iron oxide, etc.

The term "clay" as employed herein is intended to mean the various alumino-silicic acid clays. Such materials, which may comprise clay-substance (sometimes referred to as "true-clay") are more adequately disclosed and discussed in the book entitled "The Chemistry and Physics of Clays and Other Ceramic Materials" by Alfred B. Searle, published by Benn Brothers in London, England (1924).

The other silica-containing fillers capable of being employed in the practice of my claimed invention are more particularly described as salts of alumino-silicic acids which are subdivided according to the proportion of base present and the ratio of alumina (Al₂O₃) to silica (SiO₂) present in the filler. Examples of such mineral fillers are chlorite, scapolite, natrolite, etc. Additional examples of such materials may also be found in the above-mentioned book by Searle and in the examples which follow.

The proportion of treated filler to elastic product is not critical and may be varied within wide ranges. Thus, for example, I may employ, by weight, from about 0.25 to 5 parts treated filler per part of elastic product. Advantageously, I may use from about 1 to 3 parts of the treated filler per part of the elastic product in order to obtain optimum physical properties.

In order to effect an accelerated conversion or vulcanization of the filled elastic products, it is highly desirable that cure accelerators or vulcanizers be incorporated in the filled composition, preferably at the same time that the filler is incorporated in the elastic product. Among such cure accelerators may be mentioned benzoyl peroxide (the use of which is disclosed and claimed in the aforementioned Wright et al. application), tertiary butyl perbenzoate (see Marsden application Serial No. 763,445, filed July 24, 1947, now Patent Number 2,521,528), etc. The amount of cure accelerator added to the elastic product depends to some extent on the desired characteristics of the cured elastic product or synthetic silicone elastomer obtained. Preferably, I employ the cure accelerator in amounts ranging from about 0.25 to 6 per cent, by weight, based on the weight of the unfilled elastic product. Optimum values, e. g., tensile strength, hardness, elongation, and curing time, are obtained with about from 1 to 3 per cent benzoyl peroxide.

In order that those skilled in the art may better understand how the present invention may be practiced, the following examples are given by way of illustration and not by way of limitation. All parts are by weight.

Finely divided alumino-silicic acid clay comprising essentially montmorillonite was placed in a closed vessel containing about 10 per cent, by weight (based on the weight of the clay), of an azeotropic mixture of silicon tetrachloride and trimethylchlorosilane (about 45 to 55 mol per cent trimethylchlorosilane and 55 to 45 mol per cent silicon tetrachloride). The filler and mixture of chlorosilanes were thoroughly mixed together in the closed vessel so that all the particles of clay came into intimate contact with the chlorosilane mixture. After the reaction between the clay and the chlorosilane mixture, whereby hydrolysis of the latter was effected, the clay was removed and heated first at about 100° C. and then at 150° C. to remove any residual HCl resulting from the treatment.

An elastic, solid, polymerized, methyl-substituted polysiloxane obtained by condensing, with $FeCl_3.6H_2O$, the product of hydrolysis of a mass consisting essentially of dimethyldichlorosilane and containing less than 0.1 mol per cent methyltrichlorosilane, was compounded with the above-prepared treated filler by milling the materials on heated differential rubber rolls until a homogeneous sheet was obtained. The proportion, by weight, of elastic product to filler was about 1:1. During the milling step, approximately 2.2 per cent, by weight, benzoyl peroxide, based on the weight of the elastic product was intimately incorporated in the elastic product at the same time as the treated filler. The rolled sheet was then pressed between platens in a mold at a temperature of about 150° C. for approximately 10 minutes at approximately 500 p. s. i. Samples of the molded sheet were thereafter placed in a 200° C. oven for varying lengths of time to determine the effect of heat-aging on the samples.

As a control, 100 parts of untreated montmorillonite clay and 2.2 parts benzoyl peroxide were incorporated in 100 parts of the above-described elastic product in the same manner as was done above. The molded sheet was pressed and molded using the temperature conditions and then subjected to heat-aging and the same physical tests as in the case of synthetic silicone elastomers using the treated filler. Following are the results of these tests:

Table 1

| Hours of heat-aging at 200° C. | Treated Filler | | Untreated Filler | |
|---|---|---|---|---|
| | Tensile Strength, p. s. i. | Per Cent Elongation | Tensile Strength, p. s. i. | Per Cent Elongation |
| 12 | 305 | 104 | 240 | 20. |
| 24 | 345 | 89 | 120 | 12. |
| 48 | 400 | 85 | brittle, broke | brittle, broke. |
| 60 | 410 | 80 | very brittle, broke. | very brittle, broke. |

EXAMPLE 2

A comminuted, powdery, silica-containing material having the following formulation

| | Per cent, by weight |
|---|---|
| Silica | 64.91 |
| Aluminum oxide | .94 |
| Calcium oxide | 18.26 |
| Magnesium oxide | .01 |
| Iron oxide | .14 |
| Loss on ignition (due to presence of organic material) | 15.04 |
| Residue (inert inorganic materials) | .70 | was treated with an azeotropic mixture of $SiCl_4$ and trimethylchlorosilane in the manner as was done in Example 1. About 150 parts of the above-treated filler together with 3.3 parts benzoyl peroxide were compounded on milling rolls with 150 parts of the elastic product described and employed in Example 1, using the same milling procedure as was employed in the aforementioned example. The compounded composition was thereafter molded and heat-aged in the same manner as was done in that example.

As a control a molded synthetic silicone elastomer was prepared as above using the untreated filler in place of the treated filler. Following are the results of the tests on the two samples.

Table 2

| Hours of heat-aging at 200° C. | Treated Filler | | Untreated Filler | |
|---|---|---|---|---|
| | Tensile Strength, p. s. i. | Per Cent Elongation | Tensile Strength, p. s. i. | Per Cent Elongation |
| 12 | 290 | 65 | 45 | 30 |
| 24 | 335 | 80 | 90 | 40 |
| 48 | 310 | 48 | 80 | 43 |
| 60 | 365 | 54 | 35 | 60 |

EXAMPLE 3

In this example, a finely divided, powdery, silica-containing composition of matter comprising

| | Per cent, by weight |
|---|---|
| Silica | 74.48 |
| Alumina ($Al_2O_3$) | 14.64 |
| Alkali metal oxide (e. g., $Na_2O$, etc.) | 8.20 |
| Water | 1.21 |
| Residue (for example, other inorganic oxides) | 1.47 | was treated with the vapors of an azeotropic mixture of $SiCl_4$ and trimethylchlorosilane in the same manner as in Example 1. About 100 parts of the synthetic elastic product described in Example 1, 150 parts of the above-obtained treated filler and 2.2 parts benzoyl peroxide were compounded on rubber differential rolls, molded under heat and pressure, heat-aged, and tested using the same procedures and conditions as described in Example 1.

As a control an identical synthetic elastomer was prepared as above with the exception that 150 parts of the untreated filler was employed in place of the treated filler used above. Following are the results of the tests.

Table 3

| Hours of heat-aging at 200° C. | Treated Filler | | Untreated Filler | |
|---|---|---|---|---|
| | Tensile Strength, p. s. i. | Per Cent Elongation | Tensile Strength, p. s. i. | Per Cent Elongation |
| 12 | 540 | 60 | 410 | 60 |
| 24 | 565 | 40 | 425 | 40 |
| 48 | 600 | 40 | 415 | 30 |
| 60 | 630 | 40 | 400 | 22 |

From the results of the foregoing examples, it is quite apparent that definite advantages in physical properties are obtained by using the previously described class of fillers which have been treated with an organohalogenosilane prior to incorporation in the synthetic elastic product. The cured or heat-converted synthetic silicone elastomers (more specific directions for obtaining the same being found in the previously mentioned Wright et al. application) have utility, for instance, in electrical conductor insulation, as gasket materials, shock absorbers, and for other applications for which known natural synthetic rubbers are unsuitable due to their inability to withstand high temperatures 150° to 200° C. for long periods of time and which become brittle and lose their desirable, rubbery properties at temperatures as low as —50° to —60° C. My claimed cured synthetic elastomers are capable of fulfilling all the aforementioned requirements and have the added advantage of being able to be manufactured at a relatively lower expense than is possible using other more expensive fillers.

What I claim as new and desire to secure by Letters Patent of the United States is:

1. A heat-convertible composition of matter comprising (1) a solid, elastic, polymerized methyl-substituted polysiloxane containing an average of from 1.95 to 2.0 methyl groups per silicon atom and (2) a finely divided filler selected from the class consisting of (a) alumino-silicic acid clays and (b) a filler, other than such alumino-silica acid clays, analyzing, by weight, from 50 to 80 per cent of $SiO_2$ and from 50 to 19.21 per cent of a material selected from the class consisting of aluminum oxide, magnesium oxide, alkali-metal oxides, alkaline earth metal oxides, and combinations of such metallic oxides, the said filler having been previously intimately contacted with the vapors of a hydrocarbon-substituted halogenosilane whereby a water-repellent hydrocarbon-substituted polysiloxane film is formed on the surface of the individual particles of the filler, and the said treated filler thereafter heated to remove substantially all traces of formed hydrogen halide.

2. The process which comprises (1) intimately contacting with a hydrocarbon-substituted halogenosilane a filler selected from the class consisting of (a) alumino-silicic acid clays and (b) a filler, other than such alumino-silicic acid clays, analyzing, by weight, from 50 to 80 per cent of $SiO_2$ and from 50 to 19.21 per cent of a material selected from the class consisting of aluminum oxide, magnesium oxide, alkali-metal oxides, alkaline earth metal oxides, and combinations of such metallic oxides, thereby causing reaction between the filler and the hydrocarbon-substituted halogenosilane to effect deposition of a thin film of a water-repellent hydrocarbon-substituted polysiloxane, (2) heating the treated filler to remove substantially all traces of formed hydrogen halide, (3) incorporating a cure accelerator and the aforementioned treated filler in an elastic, solid, polymerized methyl-substituted polysiloxane containing an average of from 1.95 to 2.0 methyl groups per silicon atom, and (4) effecting conversion under heat and pressure of the composition of matter described in (3).

3. A heat-convertible composition of matter comprising (1) a solid, elastic, polymerized methyl-substituted polysiloxane containing an average of from 1.95 to 2.0 methyl groups per silicon atom and (2) a finely divided filler comprising an alumino-silicic acid clay, the said filler having been previously intimately contacted with the vapors of a methyl-chlorosilane whereby a water-repellent methyl polysiloxane film is formed on the surface of the individual particles of the filler, and the said treated filler thereafter heated to remove substantially all traces of formed hydrogen chloride.

4. A heat-convertible composition of matter comprising (1) a solid, elastic, polymerized methyl-substituted polysiloxane containing an average of from 1.95 to 2.0 methyl groups per silicon atom and (2) a finely divided filler, other than an alumino-silicic acid clay, analyzing, by weight, from 50 to 80 per cent of $SiO_2$ and from 50 to 19.21 per cent of a metallic oxide selected from the class consisting of aluminum oxide, magnesium oxide, alkali-metal oxides, alkaline earth metal oxides, and combinations of such metallic oxides, the said filler having been previously intimately contacted with the vapors of a methylchlorosilane whereby a water-repellent methyl polysiloxane film is formed on the surface of the individual particles of the filler and the said treated filler thereafter heated to remove substantially all traces of formed hydrogen chloride.

5. A heat-convertible composition of matter comprising (1) a solid, elastic, polymerized methyl-substituted polysiloxane containing an average from 1.98 to 2.0 methyl groups per silicon atom and (2) a finely divided filler comprising an alumino-silicic acid clay, the said filler having been previously intimately contacted with the vapors of an azeotropic mixture of $SiCl_4$ and trimethylchlorosilane whereby a water-repellent methyl polysiloxane film is formed on the surface of the individual particles of the filler, and the said treated filler thereafter heated to remove substantially all traces of formed hydrogen chloride.

6. A heat-convertible composition of matter comprising (1) a solid, elastic, polymerized methyl-substituted polysiloxane containing an average of from 1.98 to 2.0 methyl groups per silicon atom, (2) a finely divided filler for (1), other than an alumino-silicic acid clay, analyzing, by weight, about 75 per cent $SiO_2$, 15 per cent $Al_2O_3$, 8 per cent $Na_2O$, the remainder being substantially inert, inorganic material, the said filler having been previously intimately contacted with the vapors of an azeotropic mixture of $SiCl_4$ and trimethylchlorosilane whereby a water-repellent methyl polysiloxane film is formed on the surface of the individual particles of the filler, and the said treated filler thereafter heated to remove substantially all traces of formed hydrogen chloride, and (3) a cure accelerator for (1).

7. A heat-convertible composition of matter comprising (1) a solid, elastic, polymerized methyl-substituted polysiloxane containing an average of from 1.98 to 2.0 methyl groups per silicon atom, (2) a finely divided filler for (1), other than an alumino-silicic acid clay, analyzing, by weight, about 65 per cent $SiO_2$, 18 per cent CaO, 15 per cent ignitable organic materials, the remainder being substantially inert, inorganic oxides, the said filler having been previously intimately contacted with the vapors of an azeotropic mixture of $SiCl_4$ and trimethylchlorosilane whereby a water-repellent methyl polysiloxane film is formed on the surface of the individual particles of the filler, and the said treated filler thereafter heated to remove substantially all traces of formed hydrogen chloride, and (3) a cure accelerator for (1).

8. The process which comprises (1) intimately contacting a finely divided filler comprising an alumino-silicic acid clay with vapors of an azeotropic mixture of $SiCl_4$ and trimethylchlorosilane, whereby a water-repellent methyl polysiloxane film is formed on the surface of the individual particles of the filler, (2) heating the said treated filler to remove substantially all traces of formed hydrogen chloride, (3) incorporating benzoyl peroxide and the aforementioned vapor-treated filler in an elastic, solid, polymerized methyl-substituted polysiloxane containing an average of from about 1.98 to 2.0 methyl groups per silicon atom, and (4) effecting conversion under heat and pressure of the composition of matter obtained in (3).

9. The process which comprises (1) intimately contacting a finely divided filler, other than an alumino-silicic acid clay, analyzing, by weight, from about 50 to 80 per cent SiO₂ and from about 50 to 19.21 per cent of a compound selected from the class consisting of aluminum oxide, magnesium oxide, oxides of alkali metals, oxides of alkaline earth metals, and combinations of such metallic oxides, whereby a water-repellent methyl polysiloxane film is formed on the surface of the individual particles of the filler, (2) heating the said treated filler to remove substantially all traces of formed hydrogen chloride, (3) incorporating benzoyl peroxide and the aforementioned vapor-treated filler in an elastic, solid, polymerized methyl-substituted polysiloxane containing an average of from about 1.98 to 2.0 methyl groups per silicon atom, and (4) effecting conversion under heat and pressure of the composition of matter obtained in (3).

10. A heat-convertible composition of matter as in claim 5 wherein the cure accelerator is benzoyl peroxide.

11. The elastomeric, heat-converted product of claim 5.

12. A heat-convertible composition of matter as in claim 6 wherein the cure accelerator is benzoyl peroxide.

13. The elastomeric, heat-converted composition of matter of claim 6.

14. The heat-convertible composition of matter as in claim 7 wherein the cure accelerator is benzoyl peroxide.

15. The elastomeric, heat-converted composition of matter of claim 7.

MOYER M. SAFFORD.

REFERENCES CITED

The following references are of record in the file of this patent:

UNITED STATES PATENTS

| Number | Name | Date |
|---|---|---|
| 2,392,713 | Wright et al. | Jan. 8, 1946 |
| 2,410,737 | Jenny | Nov. 5, 1946 |
| 2,452,416 | Wright | Oct. 26, 1948 |
| 2,460,795 | Warrick | Feb. 1, 1949 |

FOREIGN PATENTS

| Number | Country | Date |
|---|---|---|
| 585,167 | Great Britain | Jan. 31, 1947 |

OTHER REFERENCES

Searle: Chemistry and Physics of Clay, 2nd ed., 1933, pp. 392 and 393.

Dana-Ford Textbook of Mineralogy, 4th ed., Wiley, 1932, pp. 604, 605, 606, 643, 668.

Lewis et al.: Industrial Chemistry of Colloidal and Amorphous Materials, MacMillan, 1943, page 302.